June 23, 1953  S. J. BUDLANE  2,643,062
VEHICLE HEATER
Filed Aug. 12, 1948  6 Sheets-Sheet 1

INVENTOR.
Stanley J. Budlane
BY
Freeman L. Mueller
Atty.

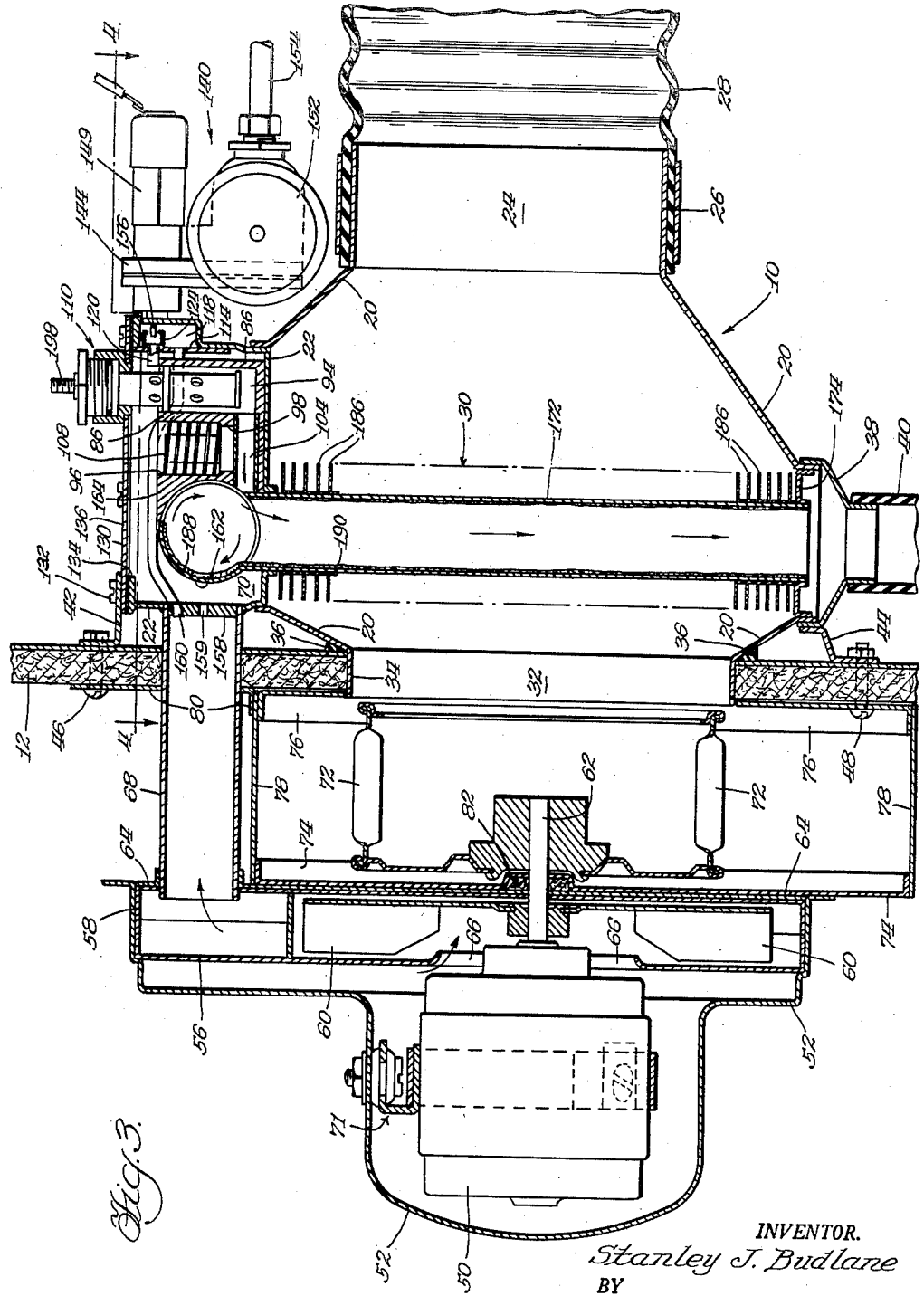

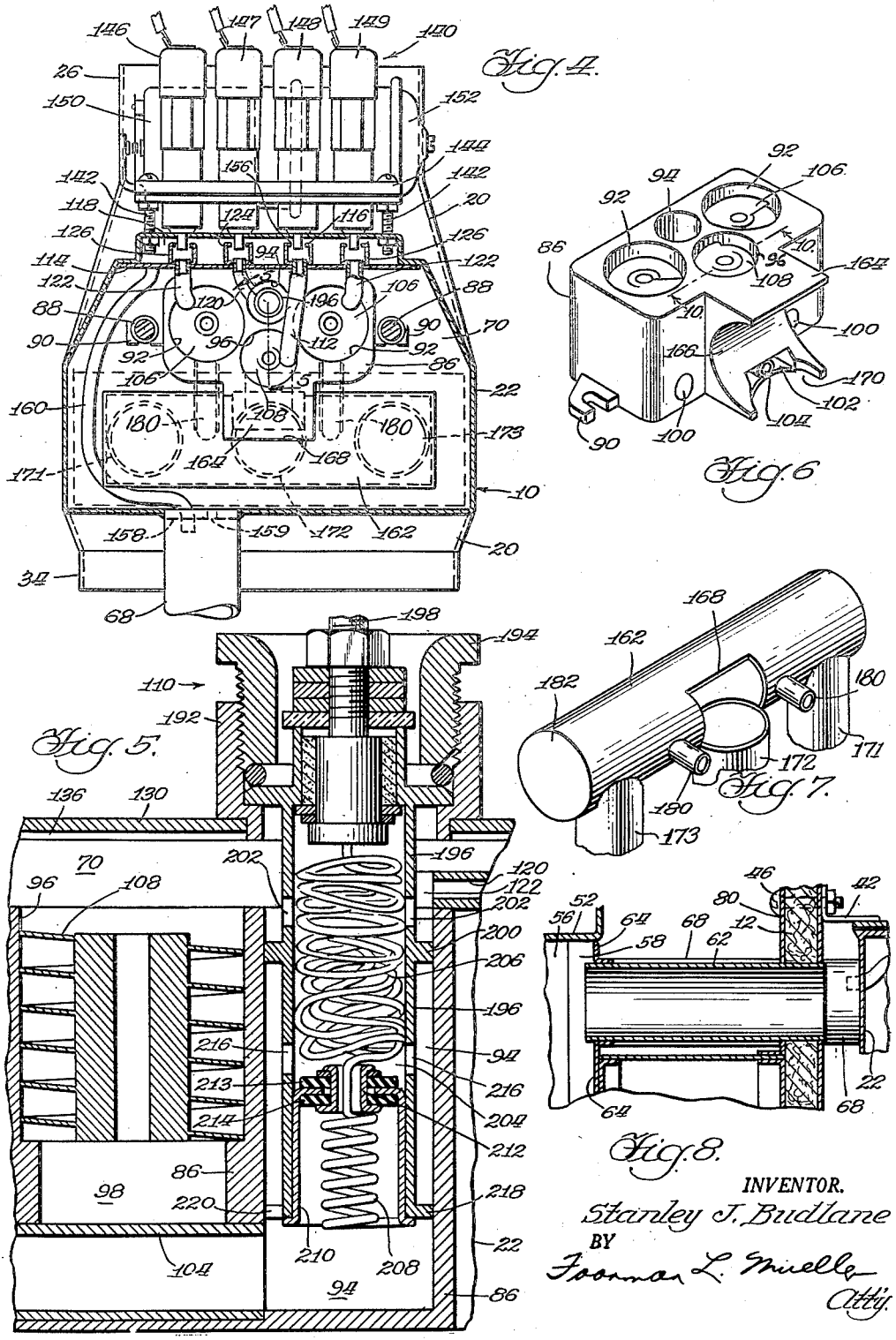

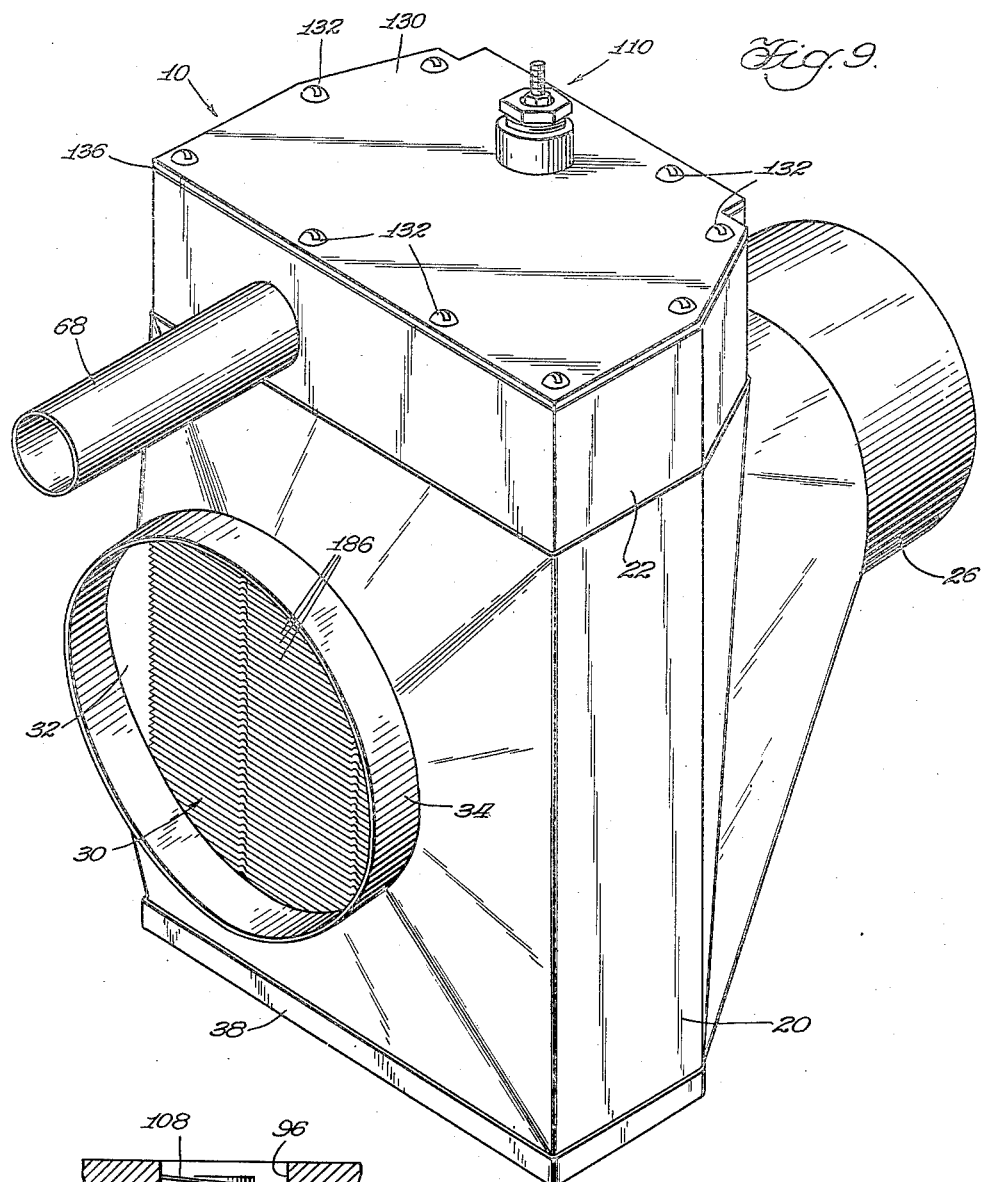

June 23, 1953　　　　S. J. BUDLANE　　　　2,643,062
VEHICLE HEATER
Filed Aug. 12, 1948　　　　　　　　　　　　　6 Sheets-Sheet 5
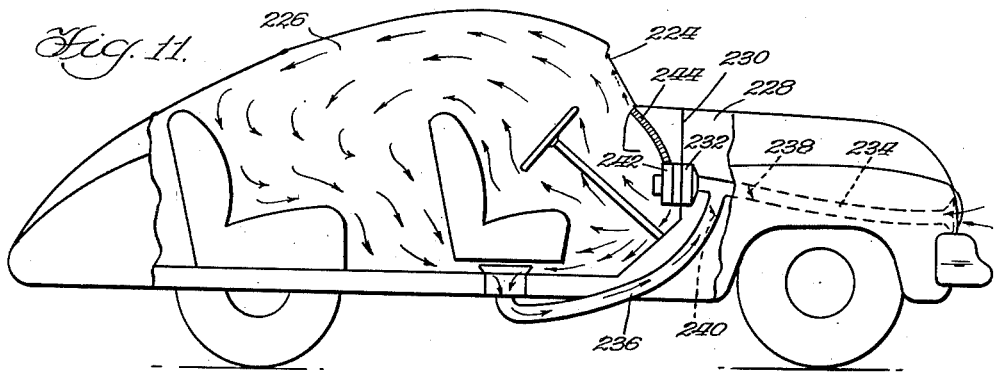
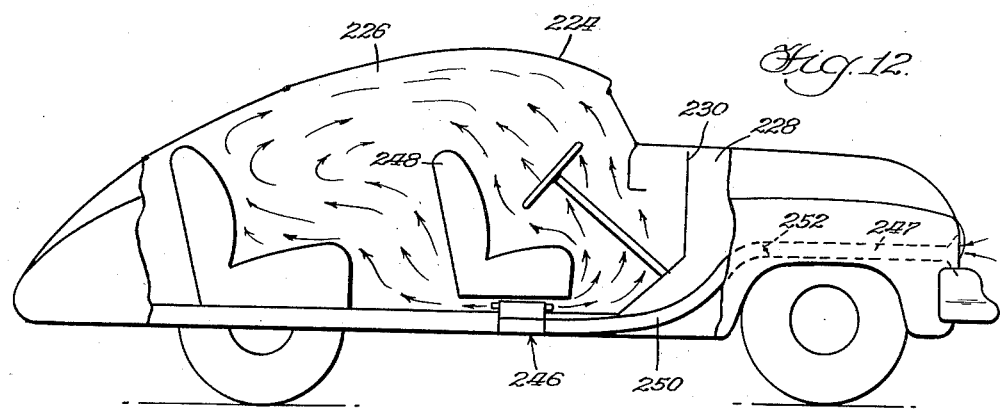
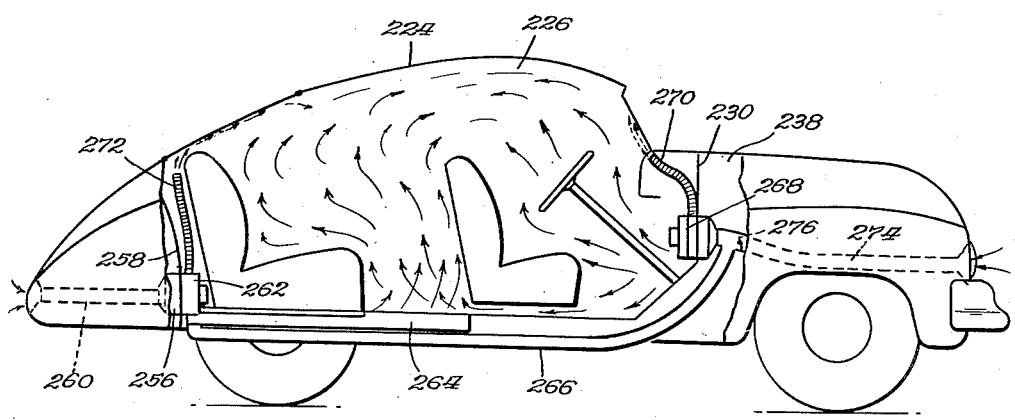
INVENTOR.
Stanley J. Budlane

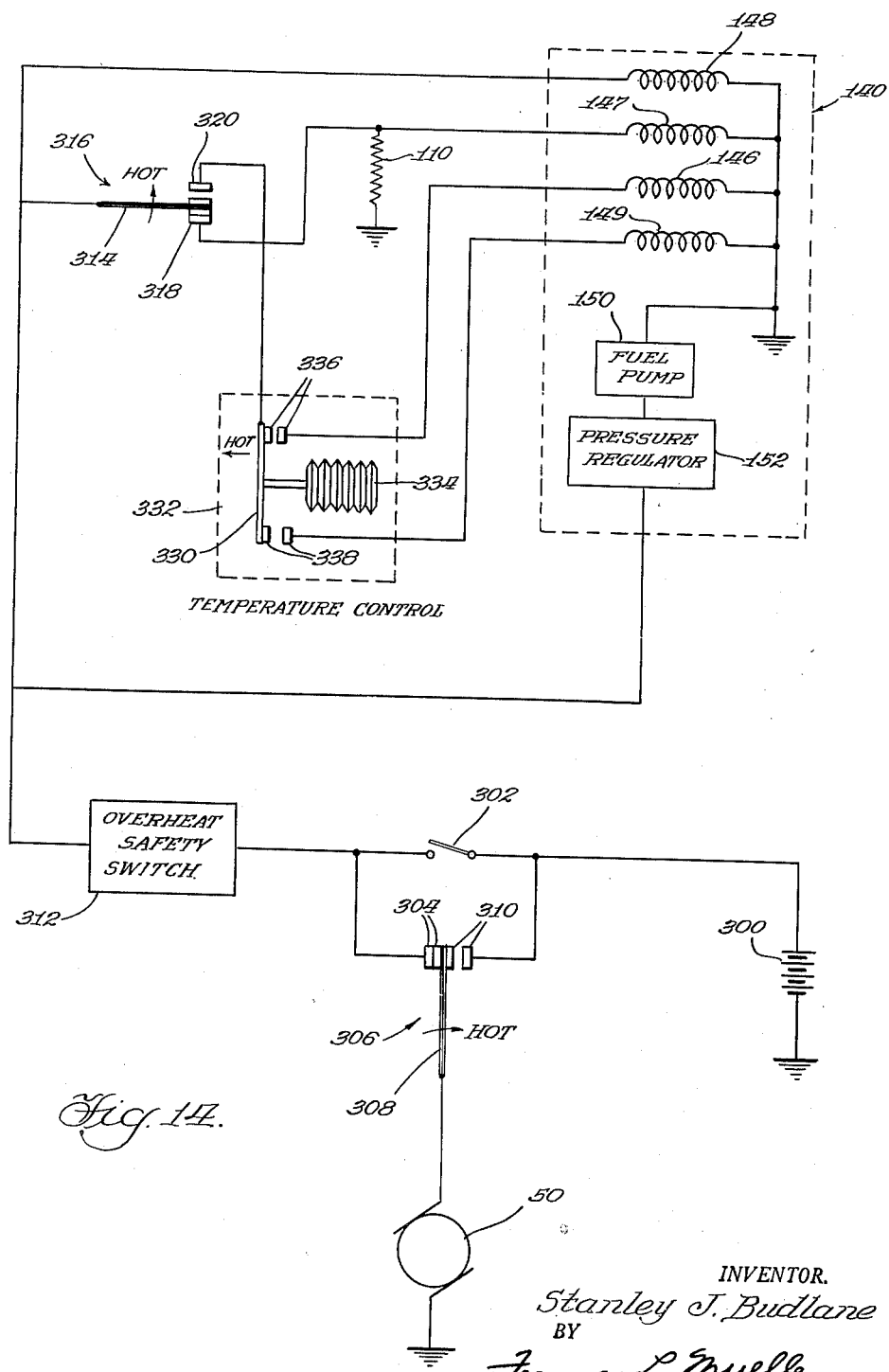

Patented June 23, 1953

2,643,062

UNITED STATES PATENT OFFICE 2,643,062

VEHICLE HEATER

Stanley J. Budlane, Chicago, Ill., assignor to Motorola, Inc., Chicago, Ill., a corporation of Illinois Application August 12, 1948, Serial No. 43,921

11 Claims. (Cl. 237—33)

This invention relates to fuel-burning heaters for heating the passenger compartments of automobiles and other vehicles.

There is at the present time a demand for a low-cost, efficient, car body heater of the fuel-burning type having a large capacity, light weight and small size. The heaviest and most expensive item in heaters of this kind as constructed heretofore has been the cast combustion chamber or cast heat exchanger which usually is employed therein. Considerable saving of weight and reduction in cost could be effected by replacing such castings with stamped or drawn parts, provided that the substitution would not affect the safe operation of the heaters. It has been customary also to mount the heater on the passenger side of the dash or fire wall of the vehicle, whereas greater safety and convenience would result if the burner portion, at least, of the heater were disposed on the engine side of this wall.

Another disadvantage of prior heaters has been their lack of adaptability to the varying requirements of individual installations. For example, some users may desire underseat heating, whereas others may prefer the normal arrangement with the heat emanating from the front of the passenger compartment, while still others want the heat to be distributed from the rear of the car. Defrosting facilities may be required on rear and side windows as well as the front windshields. It would be desirable, therefore, to have a heater which is flexible enough to meet all these conditions without basic alteration of its design.

An object of the present invention is to provide an improved fuel-burning car body heater which overcomes the disadvantages and incorporates the features referred to above, and another object is to adapt such a heater for operation independently of the vehicle engine.

A further object is to provide an improved fuel-burning car body heater constructed entirely of light-weight parts.

A still further object is to provide an efficient, low-cost, high-capacity vehicle heater which operates independently of the vehicle engine at all times, and which utilizes the motion of the vehicle to assist in pressurizing the passenger compartment.

A feature of the invention is the construction of the heat exchanger using heat exchanger tubes and heat-radiating fins to replace the casting that usually is employed in a fuel-burning car body heater. The heater housing is formed of sheet metal and is permanently bonded to the heat exchanger to afford a rugged unit of simple yet effective design.

Another feature is the provision of a plenum or air supply chamber separate from the heat exchanger but structurally constituting an integral part of the heater unit, this chamber serving to house the fuel vaporizing means and the burner structure.

Another feature is the fuel vaporizing block situated in the plenum chamber which vaporizes the liquid fuel and mixes the same with air for combustion. In conjunction with this block there is provided a burner tube which serves as the combustion chamber. The vaporizer block is suitably recessed to provide individual mixing or burner compartments for the igniter, pilot burner and main burners. The flames from all of these burners are directed tangentially into the interior of the burner tube and whirl around inside of this tube. The heat exchanger tubes communicate perpendicularly with the burner tube to provide paths for the products of combustion. Combustion is substantially completed in the burner tube so that the heat exchanger tubes merely conduct the hot gases without any appreciable flame.

Another feature is the fuel feeding package which consists of separate solenoid valves for the various burners, an electromagnetic fuel pump and a pressure regulator, all compactly arranged as a unit on the exterior of the burner housing.

Still another feature is a blower assembly comprising an electric motor, a blower for supplying combustion air to the heater, and a blower for supplying the heated ventilating air to the passenger compartment, this blower assembly being mounted on the passenger side of the fire wall.

Still another feature is the manner of mounting the heater proper (including the burner section, heat exchanger section, fuel feeding package and exhaust lead) on the engine side of the fire wall to insure safe operation.

Yet another feature is the unitary construction of the heater wherein the heat exchanger, burner tube, plenum chamber and exhaust pipe are permanently bonded to the heater housing and are hermetically sealed to prevent the leakage of combustion products into the ventilating air that passes through the heater to the passenger compartment.

The foregoing and other objects, features and advantages of the invention will be better understood from the following detailed description taken in connection with the accompanying drawings, wherein:

Fig. 1 fragmentarily illustrates, in elevation, the interior of an automobile equipped with a heating system embodying the invention;

Fig. 3 is a longitudinal vertical section through the heater taken on the line 3—3 in Fig. 2;

Fig. 4 is a horizontal section on the line 4—4 in Fig. 3, presenting a substantially plan view of the heater unit proper with its cover removed;

Fig. 5 is an enlarged vertical section through the igniter portion of the heater along the line 5—5 of Fig. 4;

Fig. 6 is a perspective view of the vaporizer block;

Fig. 7 is a perspective view of the burner tube or combustion chamber which cooperates with the vaporizer block;

Fig. 8 is a fragmentary longitudinal section through the combustion air intake duct;

Fig. 9 is a perspective view of the heater unit proper (exclusive of the blower assembly and the fuel feeding package);

Fig. 10 is a detail sectional view taken on the line 10—10 in Fig. 6;

Figs. 11, 12 and 13 are schematic views of several automobile heating systems which embody modified forms of the invention; and Fig. 14 is a diagrammatic illustration of a control system for the heater.

Figures 1, 2:
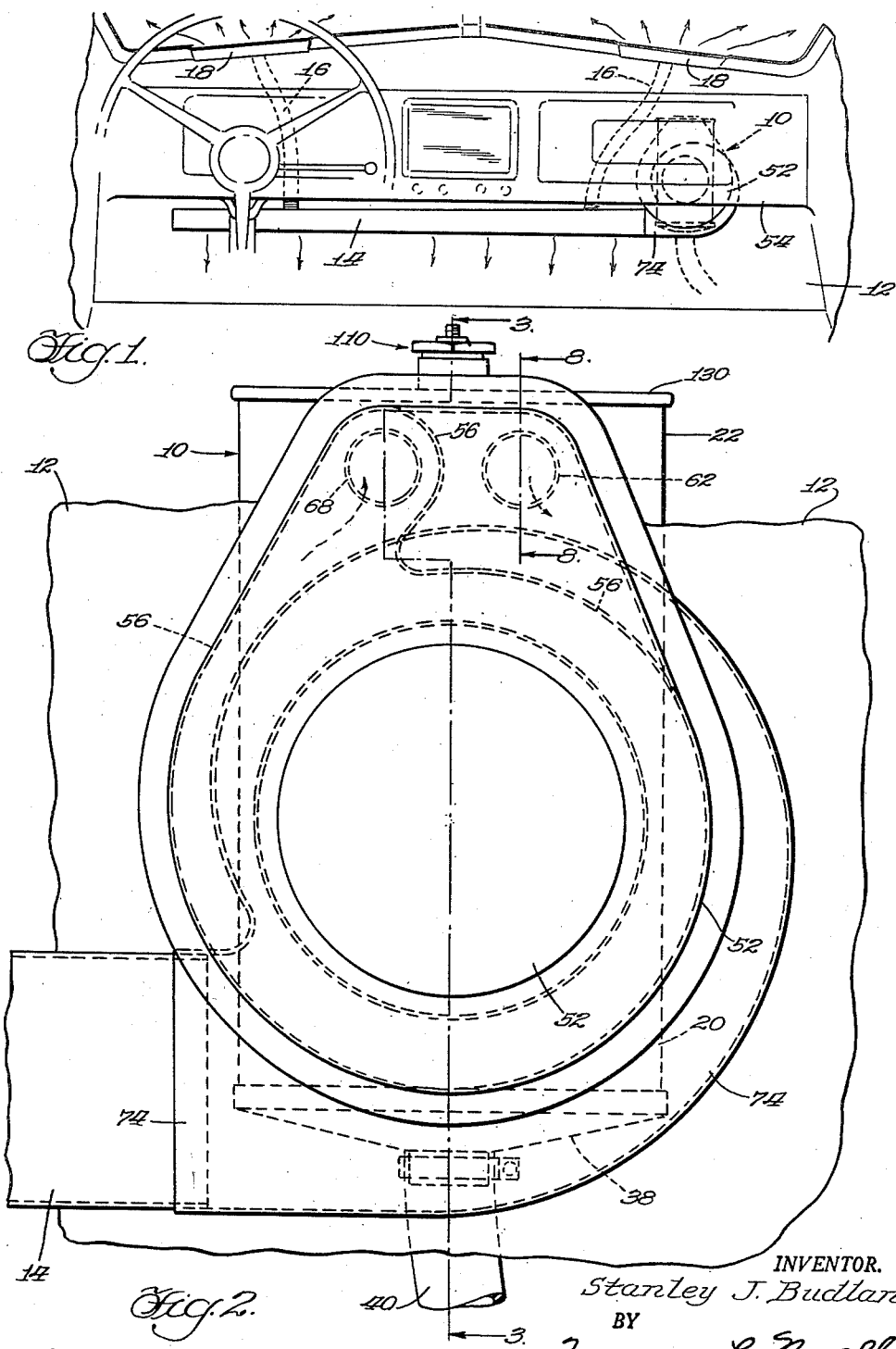
Fig. 2 is a front view of the heater showing the outline of the blower assembly, with certain portions of the engine wall broke away for clarity.

In practicing the invention, the heater unit proper is mounted on the engine side of the fire wall of the vehicle, and the blower assembly is mounted on the passenger side of such wall. The heater unit includes a plenum chamber and a heat exchanger enclosed by the heater housing and having combustion air intake and exhaust means. Combustion air is drawn from the engine compartment through a first duct that passes through the fire wall to the blower assembly, and is expelled from the blower assembly through another duct that passes through the fire wall to the plenum chamber of the heater. A fuel feeding package is mounted on the exterior of the heater housing opposite the plenum chamber. A fuel vaporizer block situated in the plenum chamber mixes and conditions the fuel and air to form a combustible mixture for each of the burners. Helical vaporizing elements in this vaporizer block insure thorough vaporization and mixing of the fuel. The pilot and main burner flames are discharged from the vaporizer block into a burner tube which produces a whirling action of the flames. The vaporizer block is kept heated by the whirling pilot flame to a substantially constant vaporization temperature. The hot gases pass from the burner tube through a group of straight heat exchanger tubes to the exhaust outlet. Heat-radiating fins are permanently bonded to the combustion tubes. The burner tubes, heat exchanger tubes and heater housing are all bonded together and hermetically sealed against any leakage of air into the passenger compartment of the vehicle. Fresh air to be heated is drawn through the heat exchanger and discharged into the interior of the vehicle by a blower, and this action is supplemented by the motion of the vehicle which creates an air ram effect. At the higher speeds of the vehicle, the air pressure built up by the vehicle motion predominates, and the ventilating air blower may rotate idly.

Referring now to the embodiment shown in Figs. 1 to 9 of the drawings, the heater proper 10, illustrated in perspective in Fig. 9, is mounted on the engine side of the dash or fire wall 12, Fig. 3, of the vehicle (that is, in the compartment of the vehicle which houses the engine). As viewed in Fig. 1, the heater 10 is disposed on the right-hand side of the vehicle and is arranged to discharge heated air under pressure into an air duct 14 which extends laterally adjacent to the fire wall 12 in the passenger compartment. The bulk of the heated air is discharged downwardly from the duct 14, and if desired, small quantities of air may be diverted from the duct 14 through flexible conduits 16 to the front windshield defrosters 18. It should be understood that this heating system is merely an illustrative example and may be varied to suit individual needs, as will be explained in greater detail presently.

The housing of the heater 10 comprises the heat exchanger housing 20, Figs. 3 and 9, and a burner housing 22. These two parts are permanently bonded together. The heat exchanger housing 20 has a circular air intake opening 24 defined by an integral flange or collar 26 which is adapted to receive the end of a flexible duct or hose 28. The forward or intake end of the duct 28 (not shown) may be disposed at the front end of the vehicle for admitting fresh outside air to the heat exchanger. The arrangement is such as to afford an air scoop or ram when the vehicle is in motion, following the well-known practice for pressurizing the interiors of the vehicles. The heat exchanger 30 of the heater is disposed in the housing 20 intermediate the intake opening 24 and a circular discharge opening 32 which is defined by an integral flange or collar 34 on the housing 20. This collar 34 is inserted into an opening in the fire wall 12. A gasket 36 intermediate the wall 12 and the housing 20 surrounding this opening absorbs vibrations which otherwise would be transmitted from the wall 12 to the heater. An exhaust lead 38, which is permanently bonded to the housing 20 at the lower end thereof, receives the end of an exhaust duct 40 which leads to any suitable discharge point beneath the vehicle chassis. Brackets 42 and 44 secured to the heater housing are anchored by bolts 46 and 48 to the fire wall 12 for mounting the heater in place on this wall.

The blower motor 50, Fig. 3, is enclosed in a blower housing 52, Figs. 1 and 3, disposed in front of the wall 12 in the passenger compartment of the vehicle. Preferably the blower housing 52 is located intermediate the wall 12 and the instrument panel 54 of the vehicle as indicated in Fig. 1. Positioned within the blower housing 52 are two complementary blower scrolls 56 and 58 (see also Fig. 2) which enclose a blower 60 that supplies combustion air to the heater. The blower 60 is mounted on the shaft 62 of the blower motor 50. The space within the housing 52 intermediate the wall of this housing and the outer scroll 56 communicates with an intake air duct 62, Figs. 2 and 8, which extends from this space through a back plate 64 and through the wall 12 to the engine compartment, terminating flush with the engine side of the wall 12.

The outer scroll 56 has an aperture 66 which surrounds the shaft 62 of the blower motor 50. Air from the interior of the housing 52 is drawn through this aperture 66 into the interior of the scrolls 56 and 58 as the blower 60 rotates. The air then is impelled by centrifugal force of the blower 60 into the upper part of the chamber defined by the scrolls 56 and 58, where it enters a discharge duct 68. The duct 68 extends through the wall of the inner scroll 58, the back plate 64, the engine fire wall 12 and the burner housing 22 to communicate with a plenum chamber 70 inside the burner housing 22. Thus, there is maintained in the plenum chamber 70 a supply of air under pressure, preferably several inches of water above atmospheric pressure.

The blower housing 52, scrolls 56 and 58, and back plate 64 are all secured together as a unit. The motor 50 is supported in any suitable manner by the blower housing 52, the means for mounting the motor in this housing being indicated generally at 71. Intermediate the blower 60 and the wall 12 there is located a blower 72 for supplying the ventilating air to the passenger compartment of the vehicle. The blower 72 is mounted on the motor shaft 62 and is enclosed by outer and inner scroll plates 74 and 76 and a scroll housing 78. The outer scroll plate 74 is secured in any desired fashion to the aforesaid plate 64 and to the blower housing 52. The outer scroll plate 74, the scroll housing 78, and the inner scroll plate 76 are secured together. The inner plate 76 is secured at its lower end by the bolt 48 to the wall 12. A bracket 80 secured to the upper end of the housing 78 is secured by the bolt 46 to the wall 12. Thus, a rigid mounting is provided for the entire blower assembly.

To prevent leakage between the chambers in which the blowers 60 and 72 are respectively disposed, the portion of the scroll plate 74 which surrounds the motor shaft 62 is formed into a cup shape to contain a quantity of packing, as indicated at 82 in Fig. 3. The scrolls 58 and 74 and the intermediate plate 64 are provided with holes just large enough to afford clearance for the shaft 62. The flange 34 on the heat exchanger housing 20 protrudes slightly beyond the wall 12, and the scroll 76 has a circular opening large enough so that the scroll may seat on this protruding portion of the flange 34. The scroll structure enclosing the blower 72 communicates with the heated air discharge duct 14, Figs. 1 and 2. As the blower 72 rotates, air is discharged by centrifugal force from the interior of the heat exchanger housing 20 to the duct 14. (If the vehicle is moving rapidly, the air ram effect may dominate the action of the blower 72.)

The fuel vaporizer block 86, Figs. 3, 4 and 6, is situated in the plenum chamber 70 above the heat exchanger 30. The block 86 rests on the bottom wall of the burner housing 22 and is secured thereto by suitable fastening means such as screws 88 which are passed through bifurcated lugs 90 on the block 86 and are threaded into tapped openings in the bottom of the burner housing 22. The block 86 preferably is made of aluminum for light weight.

In this vaporizer block 86 there are two large vertical bores 92 for the main burners and two smaller bores 94 and 96 for the igniter and pilot burner, respectively. The bore 94 is to the rear of the bore 96 at the middle of the block 86, and the bores 92 are in the end portions of the block. These bores constitute fuel vaporizing and mixing compartments for their respective burners. The igniter bore 94 extends downwardly from the top of the block 86 to within a short distance of the bottom of the block. The bores 92 and 96 extend downwardly from the top of the block 86 and terminate in spaced relation to the bottom of the block, where they join other vertical bores of smaller diameter (as in the case of the smaller bore 98, Figs. 3 and 10, which communicates with the bore 96 for the pilot burner). Horizontally extending openings 100 and 102, in Fig. 6, in the vaporizer block 86 near the bottom thereof communicate respectively with the bases of these smaller vertical bores, and the main burner flames and the pilot flame are discharged horizontally through these openings at the front of the block 86. A horizontal tube 104 communicates with the igniter bore 94 near the base thereof and extends through the centers of the bore 98 and the opening 102 to the front of the block 86. The igniter flame is discharged from the mouth of this tube 104.

Broad features of the vaporizer block 86, particularly as related to constant-temperature vaporization of the fuel (discussed hereinafter) are claimed in the copending application of Stanley J. Budlane, Serial No. 52,169, filed October 1, 1948.

Situated in the bores 92 and 96 are helical vaporizers 106 and 108, respectively, which are formed of suitable material such as copper, and an igniter generally designated 110 is received in the bore 94. Fuel lines are provided for conducting liquid fuel to the bores 92, 94 and 96. Thus, referring to Figs. 4 and 5, a fuel feeding tube 112 extends in a general horizontal direction from the upper end of the pilot bore 96 through a vertical partition 114 in the rear part of the plenum chamber 70 and terminates in aspirator portion 116 which is disposed in an auxiliary plenum chamber 118 behind the partition 114. Similarly, individual fuel feeding tubes 120 and 122 lead from the upper ends of the main burner and igniter bores 92 and 94, respectively, through the partition 114 and terminate in aspirator portions 124 and 126 within the auxiliary plenum chamber 118. When the heater is in operation, fuel such as liquid gasoline is carried along or "bubbled" in the air streams passing through these various feed tubes and enters the burner bores. In the main burner and pilot bores 92 and 96 vaporization of the fuel is expedited by the helical vaporizing elements 106 and 108. In the igniter bore 94 an electric fuel pre-heating means is provided, as will be described presently.

The plenum chamber 70 is closed on top by a cover 130 which is fastened by screws 132 or other suitable fastening devices to a horizontal flange 134, Fig. 3, at the upper end of the burner housing 22. A gasket 136 is interposed between the cover 130 and the flange 134. It should be understood, of course, that any other suitable sealing means may be employed if desired.

The fuel feeding package, generally designated 140 in Figs. 3 and 4, is mounted on the rear wall of the auxiliary plenum chamber 118 (that is, the rear wall of the burner housing 22) by bolts 142 or the like. The frame or body 144 of the package 140 supports a plurality of solenoid-operated fuel valves 146, 147, 148 and 149, respectively associated with the various burners. The package 140 also includes a solenoid pump 150 and a fuel pressure regulator 152. A fuel line 154 leading to the engine fuel supply conducts fuel to the pump 150. The solenoid valves 146 to 149 selectively admit the fuel furnished by the pump 152 to the various fuel lines leading to the burners. When any of these fuel valves is open, fuel flows through a short duct such as 156, Figs. 3 and 4, which extends from the valve through the rear wall of the burner housing 22 and terminates in the aspirator portion (as 116) of the fuel feeding tube (as 112) in the auxiliary plenum chamber 118.

The mechanical construction of the fuel package 140 is not disclosed in detail herein since it is merely incidental to the present invention. The electrical control circuit for operating the solenoid valves 146 to 149 and the igniter 110 is described hereinafter.

In order to build up suitable air pressure in the auxiliary plenum chamber 118 relative to the pressure existing in the chamber 70 for accomplishing the aforesaid aspirating action, an orifice plate 158 having an orifice 159 therein is disposed at the mouth of the combustion air supply duct 68 where it joins the burner housing 22, and a small air tube 160 extends from the air supply duct 68 through the orifice plate 158, the plenum chamber 70 and an aperture in the partition 114 to the auxiliary plenum chamber 118. The diameter and length of the tube 160 and the diameter of the orifice 159 are selected to provide a requisite air pressure within the chamber 118 slightly in excess of the air pressure in chamber 70. However, it should be understood that the invention is not restricted to the use of this particular arrangement in the event a more feasible way of achieving the same purpose is devised.

The combustion chamber of the heater comprises a tube 162, Figs. 3, 4 and 7, of suitable heat-resistant material such as stainless steel. The tube 162 extends horizontally across the front of the vaporizer block 86, and its interior is in communication with the flame discharge openings 100, 102 and 104. The block 86 has a forwardly extending, integral portion 164 which has a machined semi-cylindrical surface 166 complementary to the cylindrical surface of the tube 162. The extension 164 is of limited width, less than the spacing between the main burner flame discharge openings 100, and the tube 162 has a cut-out or opening 168 to receive the extension 164. The upper part of the extension 164 is of rectangular outline, but the lower part is recessed into a U-shape as indicated at 170, Fig. 6 to receive the upper end of a vertical tube 172, Figs. 3 and 4, which is the central one of three heat exchanger tubes 171, 172 and 173. These heat exchanger tubes, in the present instance, are made of stainless steel and they extend vertically down from the burner tube 162. It should be noted, however, that the tubes 171, 172 and 173 could be disposed at an angle from the vertical if circumstances should require this.

The burner tube 162 has openings in its lower portion to receive the heat exchanger tubes 171, 172 and 173, and it is permanently bonded to these tubes to afford a hermetic seal. Near their upper ends, the heat exchanger tubes 171, 172 and 173 pass through openings in the bottom wall of the burner housing 22, to which these tubes are bonded and hermetically sealed. At their lower ends, the heat exchanger tubes extend into openings in a bottom header plate 174, which is bonded and sealed both to these tubes and to the lower end of the heat exchanger housing 20.

The igniter flame is projected through the tube 104 into the interior of the burner tube 162, which imparts a whirling motion to this flame as indicated by the arrows in Fig. 3. The flame traverses the curved section of the burner tube 162 and then passes along the curved surface of the vaporizer block extension 164. Combustible mixture from the pilot burner fuel mixing compartment 96 in the vaporizer block 86 is discharged through the opening 102 into the interior of the burner tube 162. As best shown in Fig. 10, the lower pilot bore 98 encompasses the igniter tube 104 and, as seen in Fig. 6, the discharge opening 102 of the pilot burner extends along both sides of the tube 104. Hence, the combustible mixture furnished to the pilot burner is readily ignited by the igniter flame issuing from the mouth of the tube 104.

Once the pilot has been ignited, the igniter 110 may be deenergized and the igniter fuel valve 147 closed. Thereafter, the pilot flame continues to whirl within the burner tube 162, playing against the exposed surface of the vaporizer block extension 164. The pilot flame, in playing against the vaporizer block extension 164, causes the vaporizer block 86 to be heated and maintained at a substantial constant high temperature for vaporizing the fuel delivered to the fuel conditioning recesses 92 of the main burners. The combustion air in the reservoir or plenum chamber 70 passes into the various bores 92, 94 and 96 along with the fuel delivered thereto, and is there heated and thoroughly mixed with the vaporized fuel.

When the main fuel burner valves are opened, combustible mixture is discharged from the openings 100, Fig. 6. Referring to Fig. 7, the burner tube 162 has short tubes or sleeves projecting therefrom on either side of the cut-out 168. These tubes 180 are adapted to fit into the openings 100 for conducting the combustible mixture into the interior of the burner tube 162. This combustible mixture, like that delivered to the pilot burner, enters the lower part of the burner tube 162 tangentially and whirls around inside the tube. This whirling of the burning combustible mixture insures thorough vaporization and mixing of the fuel and air and efficient combustion thereof.

The burner tube 162 is closed at its ends by plates such as 182, Fig. 7, so that the flames may spread throughout the interior of the tube 162. It has been found that the flame distribution is quite uniform and that the heat exchanger tubes 171, 172 and 173 receive substantially equal quantities of heated combustion products from each of the burners. The arrangement is such that substantially complete combustion takes place within the burner tube 162, so that substantially no flame passes into any of the heat exchanger tubes.

From the foregoing it can be seen that the vaporizer block 86 and the burner tube or combustion chamber 162 constitute a burner structure for delivering hot combustion products to the radiating tubes 171, 172 and 173. These tubes 171, 172 and 173 are quite thin and conduct the heat from the combustion products practically instantaneously to heat-radiating fins 186, Figs. 3 and 9, on these tubes. The fins 186 are made of steel stampings which are brazed to the tubes 171, 172 and 173. In assembling the heat exchanger 30, the fins 186 are press-fitted on the heat exchanger tubes, and a copper ring is placed on each fin surrounding each tube. The entire structure then can be bonded in one operation, for example, by induction heating. In order to protect the heater from corrosion, I propose to coat the interior surfaces of the burner tube 162 and the heat exchanger tubes 171, 172 and 173 with a ceramic cement, as indicated at 188 and 190 in Fig. 3. Such a coating may be applied also to the exterior surfaces of these tubes. It may be desired also to equip the tubes 171, 172 and 173 with baffles for further increasing the heat exchange efficiency. The incoming air from the duct 28 is rapidly heated as it passes between the fins 186 of the heat exchanger. It has been found that extremely large quantities of air can be heated in this fashion.

Details of the igniter 110 are illustrated in Fig. 5. A brass bushing 192 is fitted in an opening in the burner housing cover 130, to which it is secured, and extends upwardly therefrom. A cap 194 is screw-threaded into the bushing 192. An igniter tube 196 is secured in position by the cap 194 and depends from the bushing 192 into the igniter bore 94 in the vaporizer block 86. A screw terminal 198 is insulatingly mounted in the cap 194. The tube 196 has an external annular flange 200 having a snug fit with the wall of the bore 94. Above the flange 200 apertures 202 are afforded in the tube 196 for admitting liquid fuel into a preheating chamber 204 within the tube 196. The incoming fuel delivered by the feeding tube 120 is deposited on the upper surface of the flange 200 until the level is built up to the apertures 202. Thereupon, the fuel flows into the chamber 204. Air from the plenum chamber 70 also passes through the holes 202 into the preheating chamber 204. In this chamber there is disposed a preheating element 206 which consists of fine, insulated resistance wire loosely packed in the chamber 204. The upper end of the preheating element 206 is electrically connected to the screw terminal 198, while the lower end is connected to the igniter element 208 disposed in the lower end of the tube 196.

The igniter element 208 is formed of suitable stiff resistance wire such as bare Nichrome. The element 208 is disposed in an inverted metallic cup or housing 210 tightly fitted in the lower end of the tube 196. The upper end of the element 208 passes through a grommet 212 which is mounted on insulating washers 213 and 214. Openings 216 are provided in the tube 196 just above the holder 210 to permit the flow of vaporized fuel and air mixture from the preheating chamber 204 into the bore 94 below the flange 200. The lower end of the wire 208 is grounded to the housing 210. An interrupted spacing flange 218 at the bottom of the igniter tube 196 has openings 220 through which the fuel and air mixture flows to the bottom of the bore 94 to be ignited. The combustible mixture tends to whirl about into contact with the hot wire 208, by which it is ignited. Thence, the burning mixture is forced through the lateral tube 104, from the mouth of which the igniter flame is projected into the burner tube 162 as explained previously.

In commencing the operation of the heater, the igniter fuel valve 147 is operated. Combustion air delivered by the blower 60 passes into the plenum chamber 70 and into the igniter bore 94, where it is directed into the preheating chamber 204 along with the fuel delivered to the igniter. The conditioned fuel and air mixture is ignited by the ignition element 208, and the igniter flame is directed tangentially into the burner tube 162. The pilot valve 148 also is operated to permit a flow of fuel to the pilot burner, this fuel being mixed with air and then ignited by the igniter flame at the mouth of the opening 102, Fig. 6, in the block 86. The pilot flame maintains the vaporizer block heated to a substantially constant temperature.

After establishment of the pilot flame, the igniter is cut off and the main burner valves are opened (or at least conditioned to open upon demand for heat). The heat from the main burners does not greatly affect the temperature of the vaporizer block 86 inasmuch as there is not a good heat-conductive path from the burner tube 162 to the vaporizer block 86. What little heating of the vaporizer block 86 is produced by the main burners themselves serves to compensate for the cooling effect of the additional fuel supplied to the main burners. Thus, constant vaporization temperature is maintained for optimum combustion conditions.

Combustion takes place in the whirling flame path within the burner tube 162. Hot combustion products are discharged into the heat exchanger tubes 171, 172 and 173 in the heat exchanger unit 30. Heat is transferred therefrom to the incoming air which is drawn through the heat exchanger 30 by the blower 72. The heated air is discharged into the duct 14 from which it is emitted under pressure into the passenger compartment of the vehicle. When the vehicle is standing still or moving slowly, the blower 72 builds up an air pressure within the vehicle which is slightly above atmospheric pressure. At higher speeds the motion of the vehicle produces air pressure, and the blower 72 may rotate idly. The pressurized air leaks out through the door and window openings and other crevices in the passenger compartment of the vehicle and is constantly replenished by fresh, heated air.

The disclosed heater operates very quietly and efficiently. Its excellent performance is due in large part to the arrangement of a circumferential combustion passage with a tangential inlet and a radial outlet into straight heat exchanger tubes, as shown in Fig. 3. This construction is believed to be unique in a gasoline-burning heater. A model of a heater unit built as shown in Fig. 9, having an overall height of less than one foot, has been found capable of delivering at least 20,000 B. t. u. per minute. It should be noted also that while the path for fumes and combustion products from the burners to the exhaust is relatively direct, any reverse path which might be traversed by such gases would be elongated and tortuous, thereby inhibiting leakage. Furthermore, it would be impossible for any unburned gasoline to accumulate in the heater, because the downwardly extending heat exchanger tubes would effectively drain the interior of the heater.

The heater structure disclosed herein is adaptable for use in a wide variety of vehicular heating systems. The heater embodiment illustrated in Figs. 1 to 10 is mounted on the fire wall of the vehicle and is designed to pressurize the interior of the vehicle. The heated air duct 14, Fig. 1, extends along the fire wall and discharges the heated air under substantially uniform pressure throughout its length. It is evident, however, that this pressurized duct can be extended to other locations in the car or be positioned as desired for heating the passenger compartment.

In Fig. 11 there is shown an alternate form of the invention in which the heater may be employed either for pressurized heating of fresh air or for heating recirculated air without pressurization. The automotive vehicle 224 has a passenger compartment 226, an engine compartment 228, and a fire wall 230 separating these two compartments. The heater unit 232 (identical with the heater unit 10, Fig. 9) is mounted on the fire wall 230 within the engine compartment 228, and the air intake of this heater unit communicates with the fresh air duct 234 extending to the front end of the vehicle, and it also communicates with a return air duct 236 leading from the floor of the vehicle 224 beneath one of the seats. Butterfly valves 238 and 240 are disposed respectively in the ducts 234 and 236. A blower assembly 242 mounted on the fire wall 230 within the passenger compartment 226 discharges heated air into the passenger compartment, as in the previously described embodiment of the invention. Front window defrosters as 244 may also be provided.

When it is desired to pressurize the passenger compartment 226 with the system shown in Fig. 11, the valve 240 is closed and the valve 238 is opened. Fresh air then enters the heater unit through the intake duct 234 and is discharged into the passenger compartment 226 under pressure, leaking out through the crevices in the vehicle. It is obvious, of course, that this method can be employed for cooling the vehicle as well as heating it simply by shutting off the heater and allowing the fresh air to flow into the passenger compartment unheated.

When air is to be recirculated in the passenger compartment, the valve 240 is opened and the valve 238 is closed. Under these conditions, the air from the floor of the passenger compartment 226 is drawn through the ducts 236 and is returned to the intake part of the heater 232 at substantially the same rate as air is discharged by the blower assembly 242 into the passenger compartment 226. If a mixture of fresh air and recirculated air is desired, the valves 238 and 240 may be adjusted to intermediate positions.

In the modification shown in Fig. 12, the heater 246 is mounted beneath a seat 248 in the pasenger compartment 226 of the vehicle 224. Fresh air is drawn in through the intake duct 247 and is fed through a duct 250 to the intake side of the heater 246. The heated air is discharged beneath the seat 248 under pressure to heat the passenger compartment 226. A butterfly valve 252 in the fresh air duct 234 regulates the amount of pressurization in the pasenger compartment.

In adapting a heater unit as 18 (Figs. 9 and 3) for underseat operation, as shown in Fig. 12, the structure is modified so that the heat exchanger tubes extend horizontally. These tubes can extend in any radial direction from the tubular combustion chamber. The vaporizer block remains horizontal. Slight alterations in the relative positions of the flame ports and heat exchanger tubes may be required in order to obtain the whirling flame action described above. The basic design principles, however, are unchanged.

In Fig. 13 there is schematically illustrated a heating system wherein the heater 256 is mounted on the rear wall 258 of the vehicle 224, in back of the passenger compartment 226. A fresh air intake duct 260 at the rear of the vehicle communicates with the heater 256. Heated air is discharged by the blower assembly 262 into a hot air duct 264 leading to the rear part of the passenger compartment 226, and also into another hot air duct 266 which leads to the front part of the pasenger compartment 226. An auxiliary blower 268 mounted on the fire wall 230 at the front end of the pasenger compartment serves to boost the pressure of the air which is discharged from the duct 266 into the front end of this compartment, thereby securing greater uniformity of air pressure within the passenger compartment. Front and rear window defrosters 270 and 272 are supplied with heated air by the blower assemblies 268 and 262 respectively. An alternate fresh air intake duct 274 controlled by a buterfly valve 276 communicates with the front blower assembly 268, enabling fresh air to be drawn in from the front end of the vehicle if desired. The air duct 260 may be at the side or top of the car, if desired, rather than at the rear as shown.

Fig. 14 illustrates schematically a simple form of control system for operating the car heater disclosed herein. This system has been found to operate satisfactorily, although details of it may be changed to suit individual requirements. The source of electric current for operating the system is indicated by the battery 300. When the manual on-off switch 302 is closed, circuit is extended from the battery 300 through the switch 302 and the "cold" contacts 304 of a sweepout switch 306 to the heater motor 50. The sweepout switch 306 has a bimetallic member 308 which is affected by the temperature of the heater. When the heater is hot, the switch 306 opens its contacts 304 and closes an alternative set of contacts 310, thereby connecting the motor 50 directly to the battery 300 independently of the switch 302. This enables the motor 50 to continue operating for a limited interval after the heater is turned off for cooling the combustion chamber and other heater parts and for scavenging the combustion chamber.

Closure of the manual switch 302 also establishes circuits through an overheat safety switch 312 (normally closed) to the contacts of the pressure regulator 152 in series with the electromagnetic fuel pump 150, and to the pilot valve solenoid 148 in the fuel feeding package 140. Still another electrical connection extends from the current source 300 through the switches 302 and 312 to an arm 314 of a thermal switch 316. The arm 314 is a bimetallic member which is responsive to heat from the heater, or more precisely, to the temperature of the vaporizer block 86. (Figs. 3 and 4).

When the heater is cold, the bimetallic arm 314 is in the position shown, where it is effective to complete a circuit through the "cold" contact 318 of the switch 316 to the hot-wire igniter 110 and to the igniter valve solenoid 147. When heated, the switch 316 breaks the ignition circuit by opening the contacts 318, and it closes its "hot" contact 320 to apply battery voltage to the movable contactor 330 of a temperature control device 332. The contactor 330 is actuated by a thermal member 334 which is sensitive to air temperature, being located at a suitable position in the space that is being heated. The device 332 serves to modulate the main burners of the heater in accordance with heat requirements. If a large quantity of heat is needed, contactor 330 closes two pairs of contacts 336 and 338 to effect energization of both the main valve solenoids 146 and 149. If only a moderate heat output is required, only the contacts 336 are closed, so that only one burner is operated. If minimum heat is demanded, the circuits to both of the solenoids 146 and 149 are broken, and only the pilot light functions.

To initiate operation of the heater, the switch 302 is closed, causing the motor 50, the pilot valve solenoid 148, the hot-wire igniter 110 and the igniter valve solenoid 147 to be energized. The motor 50 forces combustion air under pressure into the combustion chamber of the heater and propels ventilating air into the passenger compartment of the car. The igniter valve and the pilot valve open simultaneously, admitting fuel to the igniter and the pilot burner, respectively. The rate of fuel flow through the valves is relatively small, however, so that no hazard will be created even though ignition may be delayed for some reason. The igniter 110, which is energized concurrently with the igniter solenoid 147, ordinarily ignites the fuel when the same starts flowing. The heater is built to withstand any explosion that may take place when ignition occurs.

When the igniter flame is lighted, it immediately lights the pilot flame, and the pilot flame causes the vaporizer block to become heated. In response to this heat, the thermal switch arm 314 moves into engagement with the "hot" contact 320 and separates from the "cold" contact 318, thereby deenergizing the igniter 110 and the ignited solenoid 147. This conditions a circuit to the temperature control device 332 for enabling this device to open or close the main burner valve solenoid 146 and 149 selectively in accordance with heat requirements. As another incident to heating of the heater, the sweepout switch 306 changes over to its "hot" position in which the contacts 310 are closed, these contacts remaining closed until the heater has again become cold.

Normally the pilot flame will be maintained continuously in the heater, and the main burners are automatically turned on and off to regulate the temperature of the air in the passenger compartment of the car. If for some reason combustion should fail in the heater, such as might occur if the pilot flame is accidentally extinguished, the thermal switch 316 resumes its "cold" position, closing the ignition circuit and breaking the operating circuits to the main burner solenoids 146 and 149. The heater then goes through its starting sequence as described above to re-establish the pilot flame. If for some reason the heater temperature should become dangerously high, as would occur, for example, if the flow of air through the heat exchanger should be obstructed, the overheat safety switch 312 automatically opens and prevents the delivery of any fuel to the heater. Preferably the overheat safety switch 312 is of the type which must be manually reset to its closed position. This necessitates an investigation by the operator as to the cause of the dangerous condition before the heater can again be placed in operation.

Various advantageous features of the invention have been pointed out hereinabove, and others not specifically mentioned may be obvious from the drawings. Although several embodiments of the invention have been illustrated and described, the invention is not restricted to such disclosures but includes all modifications coming within the purview of the appended claims.

The invention is hereby claimed as follows:

1. A liquid fuel-burning heater including in combination, means defining a plenum chamber, means for supplying air under pressure to said plenum chamber, a fuel vaporizing block situated in said plenum chamber and having recesses therein, means for supplying fuel to said recesses wherein the same is mixed with air from said plenum chamber and conditioned for combustion, said block also having burner openings in one side thereof communicating with said recesses, a burner tube in said plenum chamber extending substantially parallel to said one side of said block and communicating with said burner openings, said tube being closed at its ends and being so arranged that the incoming fuel and air mixture from said vaporizing block is directed tangentially into the interior of said burner tube, substantially straight heat exchanger tubes communicating with and extending at right angles from said burner tube out of said plenum chamber, means defining an exhaust passage communicating with said heat exchanger tubes, and structure defining a heat exchange chamber surrounding the major portion of said heat exchanger tubes intermediate said plenum chamber and said exhaust passage, said means defining said plenum chamber and said exhaust passage and said heat exchanger tubes being of such construction that a hermetic seal is provided between the interiors thereof and the interior of said heat exchange chamber.

2. A liquid fuel-burning heater comprising a cylindrical burner structure with closed ends, means for supplying air and fuel in a combustible mixture to said burner structure intermediate said closed ends, said structure including portions for guiding the flame of the burning fuel in a cylindrical whirling path, straight heat exchanger tubes communicating with said burner structure intermediate said closed ends and extending in a radial direction from the axis of the cylindrical flame path defined thereby, means defining an exhaust passage communicating with said heat exchanger tubes, a housing defining a heat exchange chamber surrounding the major portion of said heat exchanger tubes intermediate said burner structure and said exhaust duct, and means for passing air through said heat exchange chamber, said burner structure, said heat exchanger tubes and said means defining said exhaust passage being of such construction that a hermetic seal is provided between the interiors thereof and the interior of said heat exchange chamber.

3. In an automotive vehicle having a passenger compartment and an engine compartment, a vehicle body heater adapted to be mounted on the fire wall separating said compartments and comprising, in combination, a burner structure, a heat exchanger communicating with at least a portion of said burner structure, a housing enclosing and supporting said burner structure, a housing enclosing and supporting said heat exchanger, said housings being joined together as a unit, supporting devices for mounting said unit on the fire wall within the engine compartment, a blower assembly adapted for mounting on the fire wall within the passenger compartment, said blower assembly including separate portions for providing combustion air and ventilating air, a combustion air intake duct extending from the engine compartment through the fire wall to said blower assembly, and a combustion air supply duct extending from said blower assembly through the fire wall to the interior of said burner housing, said heat exchanger housing having an intake portion for fresh ventilating air and an outlet portion for heated ventilating air connected to said blower assembly through the fire wall.

4. In an automotive vehicle having a passenger compartment and an engine compartment, a vehicle body heater adapted to be mounted on the fire wall separating said compartments and comprising, in combination, a burner structure, a heat exchanger communicating with said burner structure, a heater housing enclosing and supporting said burner structure and said heat exchanger, supporting devices for mounting said housing on the fire wall within the engine compartment of the vehicle, a blower assembly adapted for mounting on the fire wall within the passenger compartment, said assembly including separate blowers for combustion air and ventilating air, a combustion air intake duct extending from the engine compartment through the fire wall to said blower assembly, a combustion air supply duct extending from said blower assembly through the fire wall to said burner structure, a scroll structure in said blower assembly for directing air from said intake duct to said combustion air blower and from said blower to said supply duct, and a second scroll structure in said blower assembly for housing said ventilating air blower and adapted to direct air from said blower into the warm air distributing system of the vehicle, said heater housing having an intake portion for fresh ventilating air to be heated and an outlet portion for heated ventilating air communicating with said second scroll structure through the fire wall.

5. In an automotive vehicle having a passenger compartment and an engine compartment with a warm air supply duct disposed in said passenger compartment, a vehicle body heater adapted to be mounted on the fire wall separating said compartments and comprising, in combination, a burner structure, a heat exchanger communicating with said burner structure, a supporting structure for mounting said burner structure and said heat exchanger as a unit on the fire wall within the engine compartment of the vehicle, a blower assembly adapted for mounting on the fire wall within the passenger compartment, said assembly including a blower for combustion air and a scroll structure housing said combustion air blower, a combustion air intake duct extending from the engine compartment through the fire wall to said scroll structure, a combustion air supply duct extending from said scroll structure through the fire wall to said burner structure, said housing having an intake portion for air to be heated and an outlet portion for heated air adapted to communicate with said warm air supply duct through the fire wall, and air moving means for producing a flow of air through said intake and outlet portions.

6. A liquid fuel-burning heater comprising an upper compartment, a lower compartment, a horizontal partition between said compartments, a vaporizer block situated in said upper compartment on said partition, said block having vertical recesses extending downwardly therein, means for delivering liquid fuel and air into said vertical recesses, said block also having horizontal passages communicating with said vertical recesses and providing outlet ports for the issuance of combustible fuel and air mixture therefrom, means for igniting the combustible mixture issuing from said block, a cylindrical wall forming a combustion chamber disposed with its cylindrical axis extending horizontally in transverse relation to said horizontal passages and having wall openings communicating between the bottom portion of said combustion chamber and said horizontal passages substantially in tangential relation with said horizontal passages, heat exchanger tubes communicating with the lower part of said combustion chamber and extending downwardly therefrom, and means defining an exhaust passage at the lower ends of said heat exchanger tubes, the arrangement being such that should said igniting means fail to ignite the combustible mixture, fuel will be drained from said combustion chamber through said tubes.

7. A liquid fuel-burning heater comprising an upper compartment, a lower compartment, a vaporizer block situated in said upper compartment, mixing chambers for fuel and air in said vaporizer block, means for supplying air and fuel to said mixing chambers, said block also having openings communicating with said chambers and providing outlet ports with straight extending portions for the issuance of combustible fuel and air mixture therefrom, means for igniting the combustible mixture issuing from said block, a cylindrical wall forming a combustion chamber disposed with its cylindrical axis extending in transverse relation to said openings, the wall of said combustion chamber having combustion chamber openings communicating with said straight extending portions substantially in tangential relation to the periphery of said combustion chamber, heat exchanger tubes communicating with said combustion chamber and extending in a radial direction therefrom, and means defining an exhaust passage communicating with said heat exchanger tubes.

8. Structure as set forth in claim 7, wherein said combustion chamber and said heat exchanger tubes are coated on their interior surfaces with ceramic cement.

9. In a car heater adapted for mounting on the fire wall separating the engine compartment and the passenger compartment of a car, a fuel-burning heater structure adapted to be mounted on the fire wall within the engine compartment, a blower structure adapted to be mounted on the fire wall within the passenger compartment and communicating with said heater structure, and a pressurized warm air duct leading from said blower structure to the interior of the passenger compartment, said blower structure comprising first scroll members affording a passageway from the heater to said warm air duct, a first blower positioned in said passageway, a blower housing affording a second passageway for the intake of combustion air from the engine compartment, other scroll members affording a third passageway communicating with said second passageway for directing air into the heater to support combustion therein, a second blower positioned in said third passageway, and an electric motor for driving said blowers having a shaft on which both said blowers are mounted.

10. In a car heater adapted for mounting on the fire wall separating the engine compartment and the passenger compartment of a car, a fuel-burning heater structure adapted to be mounted on the fire wall within the engine compartment, a blower structure adapted to be mounted on the fire wall within the passenger compartment and communicating with said heater structure, and a pressurized warm air duct leading from said blower structure to the interior of the passenger compartment, said blower structure comprising inner scroll members disposed adjacent to said fire wall and affording a passageway from the heater to said warm air duct, a first blower positioned in said passageway, a blower housing affording a passageway for the intake of combustion air from the engine compartment, outer scroll members affording a third passageway communicating with said second passageway for directing air into the heater for combustion purposes, said outer scroll members being positioned farther from said fire wall than said inner scroll members, a second blower positioned in said third passageway, and an electric motor for driving said blowers having a shaft on which both said blowers are mounted.

11. A vehicle heater positioned beneath a seat in the passenger compartment of a vehicle, comprising a vaporizer block having horizontally extending passageways for combustible fuel and air mixture and vertical recesses communicating with said passageways for mixing liquid fuel and air to form a combustible mixture, means for igniting the combustible mixture issuing from said vaporizer block, a tubular combustion chamber so positioned in relation to said block that the flames are directed tangentially into the interior of said chamber, said chamber being arranged with its tubular axis extending substantially in a horizontal direction transverse of said vaporizer block passageways, heat exchanger tubes communicating with the interior of said combustion chamber and extending in a radial direction therefrom at right angles to the tubular axis, and means for moving air past said heat exchanger tubes and into the passenger compartment of the vehicle.

STANLEY J. BUDLANE.

References Cited in the file of this patent

UNITED STATES PATENTS

| Number | Name | Date |
|---|---|---|
| 2,009,823 | Van Vulpan | July 20, 1935 |
| 2,114,269 | Moore | Apr. 12, 1938 |
| 2,157,643 | Westwick | May 9, 1939 |
| 2,175,812 | Meyerhoeffer | Oct. 10, 1939 |
| 2,177,870 | Deitz | Oct. 31, 1939 |
| 2,286,853 | Holthouse | June 16, 1942 |
| 2,302,456 | McCollum | Nov. 17, 1942 |
| 2,342,872 | LeFevre | Feb. 29, 1944 |
| 2,349,694 | Barr et al. | May 23, 1944 |
| 2,384,468 | Holthouse | Sept. 11, 1945 |
| 2,400,117 | Holthouse | May 14, 1946 |
| 2,403,230 | Nagel et al. | July 2, 1946 |
| 2,421,370 | Budlane | June 3, 1947 |
| 2,429,842 | Pinkerton et al. | Oct. 28, 1947 |
| 2,447,373 | Smoot | Aug. 17, 1948 |
| 2,454,512 | Heymann | Nov. 23, 1948 |
| 2,492,756 | McCollum | Dec. 27, 1949 |